United States Patent [19]

Schriefer, Jr.

[11] E Re. 30,136

[45] Reissued Nov. 6, 1979

[54] SOLAR PANEL

[76] Inventor: Arno H. Schriefer, Jr., R.R. #1, Dewey, Ill. 61840

[21] Appl. No.: 909,719

[22] Filed: May 25, 1978

Related U.S. Patent Documents

Reissue of:

[64] Patent No.: 4,073,282
Issued: Feb. 14, 1978
Appl. No.: 723,987
Filed: Sep. 16, 1976

[51] Int. Cl.[2] ..... F24J 3/02

[52] U.S. Cl. ..... 126/441; 126/449; 126/450

[58] Field of Search ..... 126/270, 271; 237/1 A

[56] References Cited

U.S. PATENT DOCUMENTS

| | | | |
|---|---|---|---|
| 201,439 | 3/1878 | Moreau | 126/270 |
| 2,998,005 | 8/1961 | Johnston | 126/270 |
| 3,102,532 | 9/1963 | Shoemaker | 126/270 |
| 3,117,414 | 1/1964 | Daniels et al. | 126/270 |
| 3,863,621 | 2/1975 | Schoenfelder | 126/270 |
| 3,875,925 | 4/1975 | Johnston | 126/270 |

*Primary Examiner*—James C. Yeung
*Attorney, Agent, or Firm*—Jack E. Dominik

[57] ABSTRACT

A solar collector for use in receiving solar radiation and converting the same to heat. A matrix of plural layers of slit-and-expanded sheets are contained within the solar collector and the heat produced by the matrix absorbing solar radiation is transferred by convection into a forced fluid path. The surfaces of the slit-and-expanded sheets are coated to absorb and convert the radiant energy to heat and the various layers are relatively positioned at 90° to provide improved tracking of the sun in its diurnal path, the sheets having unidirectional raised portions to more efficiently absorb the sun's rays. A reflective surface behind the matrix reflects solar energy back into the matrix. A fluid, usually air, is heated by convection as it is forced through the matrix in the solar collector.

8 Claims, 7 Drawing Figures

SOLAR PANEL

Matter enclosed in heavy brackets [ ] appears in the original patent but forms no part of this reissue specification; matter printed in italics indicates the additions made by reissue.

BACKGROUND OF THE INVENTION

This invention pertains to solar collectors and more particularly to solar collectors wherein multiple layers of slit-and-expanded sheets form a matrix. The surfaces of the sheets are coated to absorb radiant energy. A reflective surface behind the matrix reflects radiant energy back into the matrix.

The prior art has taught the use of using slit-and-expanded aluminum sheet matrix solar collectors as recited in a paper by J. B. Chiou, M. L. El-Wakil, J. A. Duffie. "A slit and expanded aluminum foil matrix solar collector" Solar Energy 9 (No. 2): 73–80, 1965. Also the use of a slit and expanded metal sheet with a reflective surface on one side of the metal sheet is illustrated in U.S. Pat. No. 3,102,532. Other U.S. Patents dealing with this subject matter are U.S. Pat. Nos. 2,998,105 and 3,863,621.

The present invention leads to the objects and advantages in the art of solar collectors which will now, in part, be enumerated.

SUMMARY OF THE INVENTION

A solar collector assembly is now provided which comprises a sealed box having provisions for air inlet and exhausts and has a clear plastic or glass window to allow solar energy to enter. There are multiple layers of slit-and-expanded metal sheets, the opposite sides being coated to absorb the radiant energy which is converted to heat. The orientation of each sheet is rotated 90° relative to an adjoining sheet so that the preferred body disposition of the sheet covers a range of at least 180°. A reflective surface opposite the transparent glass or plastic reflects radiant energy which has passed through the matrix back into the matrix. The solar collector is insulated to reduce the heat lost to the atmosphere and maximize the overall efficiency of converting radiant energy to heat and convecting the heat to the fluid media.

OBJECTS AND ADVANTAGES OF THE INVENTION

An object of the invention is to provide an improved solar collector which is highly efficient in that the heat is collected in an improved manner and the heat lost to the atmosphere is minimized. It is a feature of this object that raised body portions in the matrix are relatively oriented to efficiently absorb solar energy in its diurnal path.

Another object of the invention is to provide a solar collector which can be easily and inexpensively manufactured and operated.

Still another object of the invention is an improved solar collector which can be connected in series to other solar collectors to increase the capacity of a total system.

A further object of the invention is to provide an improved means of transferring the thermal heat from the slit-and-expanded metal sheet to the fluid by causing the fluid medium to flow in a turbulent manner through the mesh openings and around the metal sides defining the mesh openings.

DESCRIPTION OF THE DRAWINGS

Other objects and advantages of the invention will become apparent on reading the following detailed description and upon reference to the drawings, in which.

DETAILED DESCRIPTION OF THE INVENTION

Figure 1:
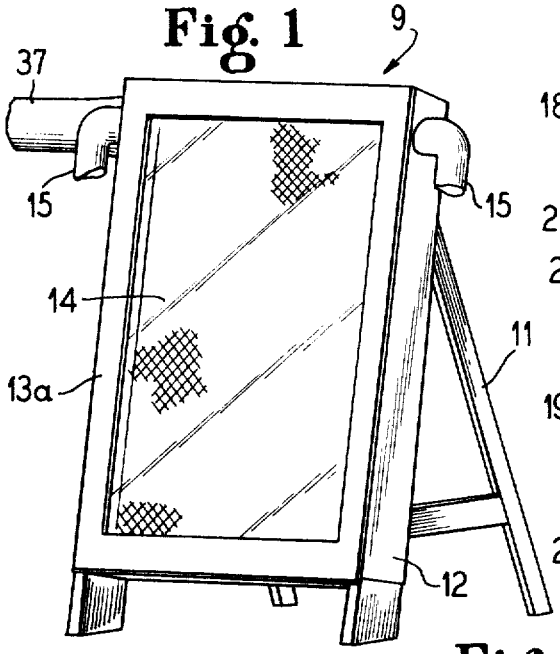
FIG. 1 is a perspective view, with portions removed, of the solar collector.
Figure 4:
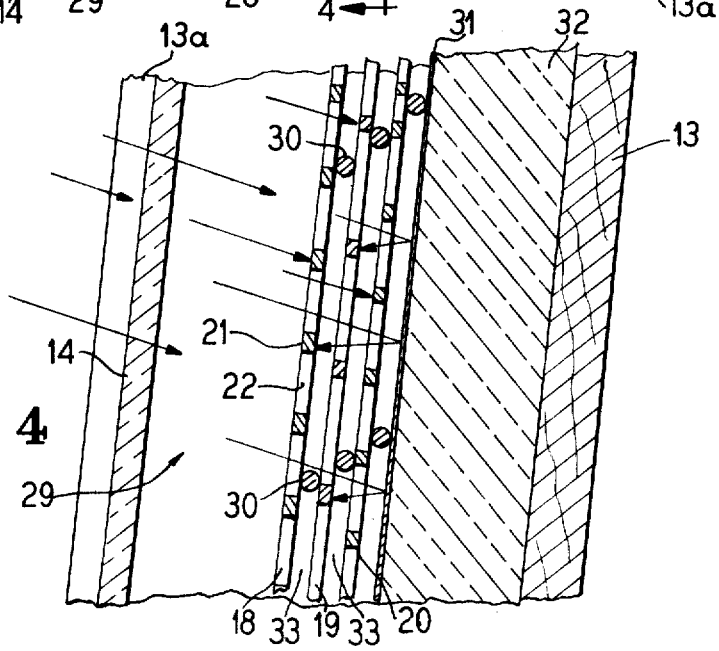
FIG. 4 is a sectional view of an enlarged scale taken along lines 4—4 of FIG. 3, with portions removed, indicating the rays of solar energy incident upon the solar collector.

Turning first to FIG. 1, there is seen a solar collector 9 with a frame support 11, which maintains the solar collector at as close to a 90° angle to the incident solar rays as practical. The collector is in the form of a housing, and includes a clear glass front panel 14 mounted within a continuous sidewall frame 12 to allow the radiant energy to enter the solar collector 9 while containing the heat transfer fluid. A rear panel 13 (FIGS. 4 and 6) is present, as well as a continuous front frame part 13a. The glass panel 4 could also be manufactured of a clear plastic material which would serve the same purpose. There are also shown, fluid inlets 15 and an exhaust duct 37, the purposes of which will be later described.

Figure 3:
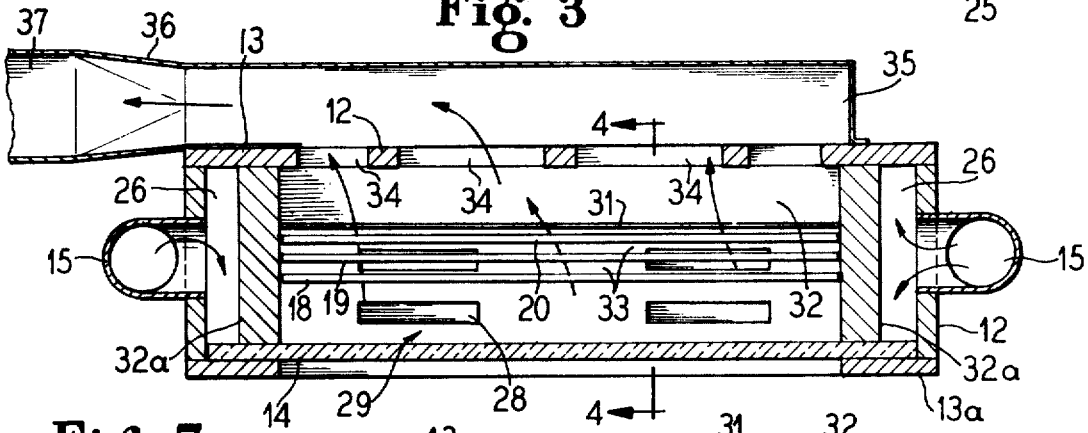
FIG. 3 is a sectional view taken along 3—3 of FIG. 5 on an enlarged scale, with portions removed.
Figure 5:
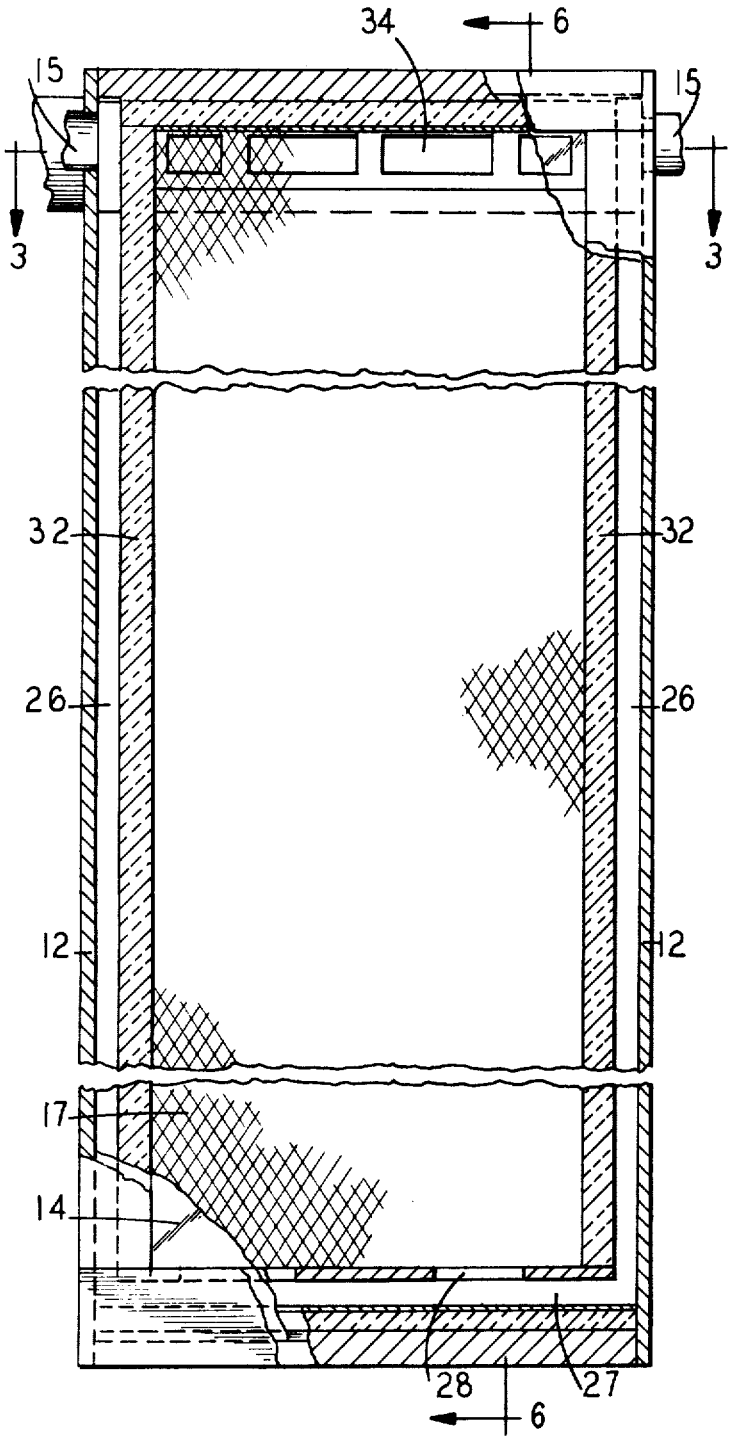
FIG. 5 is a side elevational view, with portions removed, of the solar collector.
Figure 6:
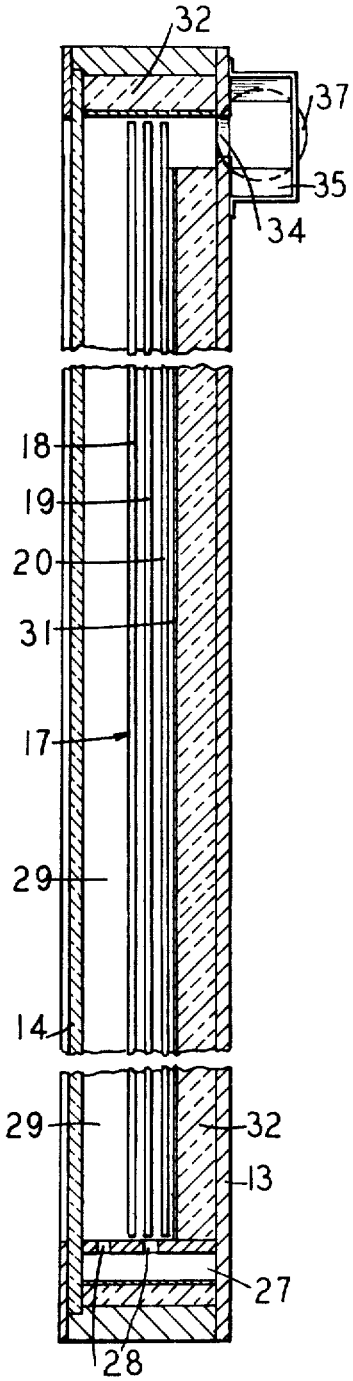
FIG. 6 is a sectional view taken along line 6—6 of FIG. 5

FIGS. 5 and 6 clearly illustrate the flow of the forced fluid media through the system. The fluid, such as forced air, enters at the fluid inlet 15 and travels down a passageway 26 and into a fluid inlet chamber 27. The fluid then enters a fluid chamber 29 through fluid inlet ports 28. It is in the fluid chamber 29 where the heat transfer occurs. The forced fluid passes through a matrix of slit and expanded sheets 17 where the heat is transferred by convection to the fluid media. The fluid then is exhausted through exhaust ports 34 into an exhaust manifold 35. The exhaust manifold 35 is connected to the exhaust duct 37 by means of an expansion duct 36. (FIG. 3)

The method by which the matrix 17 is heated by the radiant energy is most clearly illistrated in FIG. 5. Radiant energy (indicated by arrows) passes through the glass panel 14 and strikes the matrix 17 of three layers of slit-and-expanded sheets. There is a top layer 18, a middle layer 19, and a bottom layer 20. Each layer of slit and expanded sheet 21 has black surfaces on opposite sides to absorb the radiant energy. There are spacers 30 which add structural strength to the matrix and maintain a fluid passageway 33 between the layers. Radiant energy passing through the matrix, without absorption, strikes a reflective surface 31 and is reflected back into the matrix 17 to be absorbed by the slit-and-expanded sheets. The reflective surface is a polished film mounted on a low density, rigid insulating backing material 32, such as rigid polyurethane foam, which helps reduce heat loss and increases the solar collector's efficiency. The insulating backing material 32 is mounted to the back panel 13.

Figure 2:
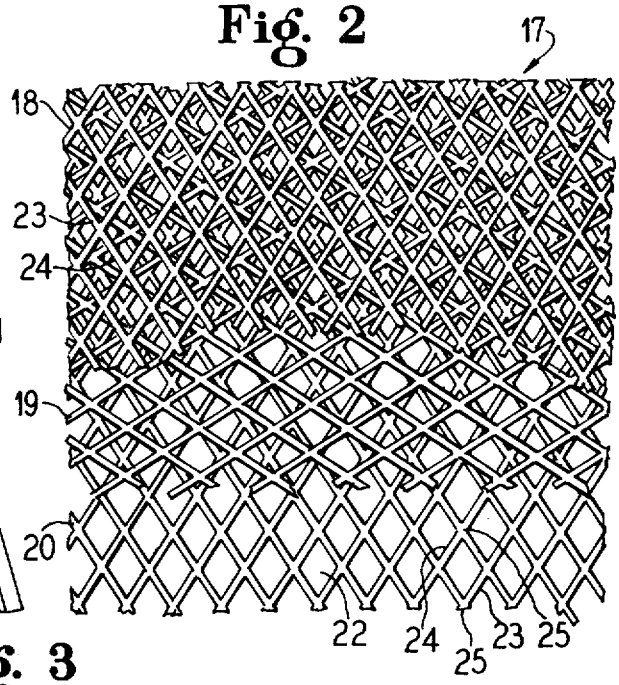
FIG. 2 is a plan view of the arrangement of the slit-and-expanded sheet matrix, with portions removed, and on an enlarged scale.

The orientation of the individual layers in the marix 17 is clearly shown in FIG. 2. In the manufacturing process of slit-and-expanded sheet or foil, the formation of the web-like structure by stretching slit metal causes the structure to be oriented in one direction relative to each individual opening 22. Thus, each opening has a leading side 23 and a trailing side 24. Each side extends between terminating ends 25. The sheet presents a network of open meshes defined by closed loops which, in turn, are defined by sides 23 and 24. Each side has positions displaced laterally from an axis between the terminating ends 25. The raised sides are aligned in alternating rotation with lowered sides in two sets of rows. In one set, the raised sides are aligned along a line which touches the farthest extending point of such sides; and the raised sides are aligned in the other set of rows along a line which intersects the farthest extending point of such raised sides. One set of rows is normal to the outer set of rows. By placing the top layer 18 with the leading side in one direction, and the bottom layer 20 with the leading side 23 in the opposite direction relative to the top layer 18, and then placing the middle layer 19 with the leading side at a 90° angle relative to both the top layer 18 and bottom layer 20, certain advantages are achieved. One such advantage is that due to the disposition of the web-like structures, portions of a layer are normal to the rays of the sun when the sun is at high incident angles to the general plane of the collector. The incident angle is defined as the angle between the sun's rays and a line perpendicular or normal to the irradiated surface. A second advantage is that the turbulence of the fluid flowing through the matrix is increased, thereby increasing the amount of heat transferred by convection from the individual layers to the fluid.

Figure 7:
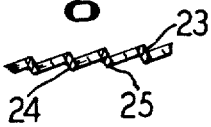
FIG. 7 is a portional side elevational view of a slit-and-expanded sheet metal layer, on an enlarged scale, and somewhat diagrammatic.

Each sheet of slit-and-expanded metal includes one set of rows of closed loops and meshes, and the second set of rows normal to the first set. For convenience, a row is designated as horizontal wherein the trailing and leading sides are aligned, such as a row extending from top to bottom in the view of FIG. 2. The other set of rows are designated as vertical when the leading and trailing sides are in alternating position. The view of FIG. 7 indicates a vertical row in side elevation with the trailing and leading sides shown in such alternating position. All the leading sides are raised and are common to a high point plane. All the trailing sides are lowered and are common to a low point plane.

The improved matrix of this invention requires that the vertical rows of one sheet are at right angles to vertical rows of an adjoining sheet. Thus, the raised leading sides are commonly oriented in each slit-and-expanded sheet. These raised leading sides favorably absorb solar energy when the sun's diurnal positions are optimal. The raised leading sides of an adjoining sheet will favorably absorb solar energy in other optimal diurnal positions, and likewise will the third sheet. The three sheets present a 180° extension to favorably absorb solar energy throughout the diurnal path of the sun.

FIG. 3 shows the flow of the fluid from the fluid inlet 15 and down the passageway 26. The passageway is defined by the continuous sidewall frame 12 on the outside and side insulating bodies 32a on the inside, joining the rear panel 13 and the clear panel 14. In this way the fluid is preheated by any heat escaping through the insulating material 32 due to conduction from the matrix 17. After the fluid passes through the fluid chamber 29 and matrix 17, heat absorbed by convection into the fluid is carried by the fluid through the exhaust ports 34 above the reflective backing, and into the exhaust manifold 35. The fluid can then be utilized to heat residential areas, serve industrial uses, or be stored for future use.

The fluid is generally pumped through the solar collector (pump not shown) so that a constant flow of fluid is being heated and the efficiency of the unit increased.

It has been found that three layers of slit and expanded foil give optimum performance. When using quarter inch Hexmesh manufactured by Exmet Corporation of Bridgeport, Connecticut, the following data was obtained: the original material thickness was 0.040 inch and after expansion the strand width thickness was 0.050 inch. The approximate percentage of open area was 68 percent. The apparent extinction of light was with one sheet, 46% with two sheets, 82%, and with three sheets 97%. The sheets were placed in planes parallel to each other to effect as much light extinction as possible.

Although slit-and-expanded sheets have been described herein for the matrix other sheets will find use such as coated plastic. Both sides of the individual layers should be coated with a black light absorbing material, and each sheet should have raised portions oriented along a regularly repeating unidirectional line, that is, all the side portions on the same side of all the closed loops are in leading or raised positions, in two sets of rows, one normal to the other, as described previously.

Thus it is apparent that there has been provided, in accordance with the invention, an improved solar panel that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a solar collector having a housing, a front transparent panel to allow solar energy to pass into the housing, a back panel, and means for delivering forced fluid into and out of the housing, the improvement comprising:

a matrix of multiple layers of [a black] *an absorbtive* coated sheet, each layer having a plurality of open meshes, defined by a closed loop, each loop having a raised side portion and a lowered side portion, and all said raised portions being regularly repeated along a unidirectional line, said unidirectional line in one sheet positioned at *multiples of* 90° relative to a unidirectional line in an adjoining sheet of the matrix, and a reflective surface within the housing at said back panel, said reflective surface spaced from said matrix.

2. The improvement in a solar collector which includes the features of claim 1 wherein said reflective surface includes a reflective film bonded to a rigid, low density insulating body.

3. The improvement in a solar collector which includes the features of claim 1 wherein said matrix has three layers of black coated sheet, a first and last layer having said regularly repeatedly raised portion along unidirectional lines which are disposed at 180° relative to each other, and an intermediate layer having said raised portions regularly repeated along a unidirectional line which is positioned at 90° relative to said other layers.

4. The improvement in a solar collector which includes the features of claim 3 wherein each of said layers in a slit-and-expanded aluminum sheet, the mesh openings and the closed loops having substantially uniform dimension in each of said sheets.

5. The improvement in a solar collector which includes the features of claim 4 wherein each closed loop has a leading raised side and a trailing lowered side, and each of said sides having spaced terminating ends which close the loop, the leading and trailing sides having portions displaced from the axis of the loop which connect said terminating ends.

6. The improvement in a solar collector which includes the features of claim 5 wherein the raised sides of each closed loop are aligned in spaced relationship by a lowered side along sets of rows which are normal to one another, said alignment being along a line which is tangential to the raised sides in one set of rows; and said alignment being along a line which intersects said sides along the other set of rows.

7. The improvement in a solar collector which includes the features of claim 6 wherein spacer bodies separate one sheet from another sheet so that the respective sheets are closely bunched in parallel relationship within the matrix.

*8. A method of solar collection by a matrix of expanded sheets having an orientation of repetitive closed loops, each loop having raised side portions and a lowered side portion, all of said raised portions being regularly repeated along a unidirectional line,*

*positioning two or more of said sheets with regard to each other in multiples of 90° orientation of said unidirectional sheets,*

*and positioning a reflective surface behind said sheets,*

*and delivering forced fluid into and out of a housing which contains said sheets having a front transparent panel to allow solar energy to pass into the housing and against the raised portions of said sheets.*

* * * * *